United States Patent
Larkin et al.

(10) Patent No.: US 9,446,763 B2
(45) Date of Patent: Sep. 20, 2016

(54) CONTROLLED GEROTOR ACTUATED PRE-TRANS PARALLEL HYBRID

(75) Inventors: Bradley R. Larkin, Shelby Township, MI (US); Douglas Bradley, Sterling Heights, MI (US)

(73) Assignee: MAGNA POWERTRAIN INC., Concord (CA)

( * ) Notice: Subject to any disclaimer, the term of this patent is extended or adjusted under 35 U.S.C. 154(b) by 73 days.

(21) Appl. No.: 13/996,710

(22) PCT Filed: Dec. 14, 2011

(86) PCT No.: PCT/US2011/064830
§ 371 (c)(1),
(2), (4) Date: Jul. 3, 2013

(87) PCT Pub. No.: WO2012/087699
PCT Pub. Date: Jun. 28, 2012

(65) Prior Publication Data
US 2013/0281259 A1    Oct. 24, 2013

Related U.S. Application Data

(60) Provisional application No. 61/426,816, filed on Dec. 23, 2010.

(51) Int. Cl.
*B60W 20/00* (2016.01)
*B60W 10/02* (2006.01)
(Continued)

(52) U.S. Cl.
CPC .............. *B60W 20/40* (2013.01); *B60K 6/387* (2013.01); *B60K 6/405* (2013.01); *B60K 6/48* (2013.01);
(Continued)

(58) Field of Classification Search
CPC .... B60W 20/40; B60W 10/02; B60W 10/08; B60W 2510/02; B60W 2510/0208; B60W 2710/02; B60W 2710/021; F01C 1/103; F01C 1/104; B62D 5/097; F04C 2/10
USPC ...... 475/5; 477/3, 5, 6, 180, 143; 180/65.21, 180/65.285, 65.6; 192/65.02, 85.24, 103 F; 418/61.3
See application file for complete search history.

(56) References Cited

U.S. PATENT DOCUMENTS 4,950,214 A * 8/1990 Botterill .................. 475/231
6,041,903 A * 3/2000 Burns et al. ............ 192/85.02
(Continued)

FOREIGN PATENT DOCUMENTS

DE  102007062237 A1  6/2009
JP  2008126702 A    6/2008

OTHER PUBLICATIONS

JP2008126702—Akutagawa, Jun. 2008 (machine translation).*
(Continued)

*Primary Examiner* — Jacob S Scott
*Assistant Examiner* — Tinh Dang
(74) *Attorney, Agent, or Firm* — Dickinson Wright PLLC

(57) ABSTRACT

A pre-transmission unit for a hybrid drive system includes an input shaft adapted to be driven by an internal combustion engine. An electric motor includes a rotor fixed for rotation with an output shaft, and a stator fixed to a housing. A multi-plate clutch is positioned in the housing to drivingly interconnect the input shaft and the rotor. The clutch includes a piston for applying an input force to the clutch plates. A pump is positioned in the housing and includes an input member fixed for rotation with the rotor. The pump provides pressurized fluid to the piston. A valve regulates the fluid pressure applied to the piston and varies the torque transferred by the clutch.

21 Claims, 2 Drawing Sheets

(51) Int. Cl.
| | |
|---|---|
| *B60W 10/08* | (2006.01) |
| *B62D 5/097* | (2006.01) |
| *F04C 2/10* | (2006.01) |
| *B60K 6/387* | (2007.10) |
| *B60K 6/405* | (2007.10) |
| *B60K 6/48* | (2007.10) |
| *B60W 10/06* | (2006.01) |
| *B60W 30/18* | (2012.01) |
| *B60W 30/192* | (2012.01) |
| *F16H 61/00* | (2006.01) |
| *F16D 48/06* | (2006.01) |
| *F16D 48/02* | (2006.01) |

(52) U.S. Cl.
CPC .............. *B60W 10/02* (2013.01); *B60W 10/06* (2013.01); *B60W 10/08* (2013.01); *B60W 20/00* (2013.01); *B60W 30/18027* (2013.01); *B60W 30/192* (2013.01); *F16D 48/066* (2013.01); *F16H 61/0031* (2013.01); *F04C 2/10* (2013.01); *F16D 2048/0269* (2013.01); *F16D 2500/1024* (2013.01); *F16D 2500/1045* (2013.01); *F16D 2500/1066* (2013.01); *F16D 2500/3023* (2013.01); *F16D 2500/7041* (2013.01); *F16D 2500/7044* (2013.01); *Y02T 10/6221* (2013.01); *Y02T 10/6286* (2013.01); *Y10S 903/902* (2013.01); *Y10T 477/26* (2015.01)

(56) References Cited

U.S. PATENT DOCUMENTS

| | | | | |
|---|---|---|---|---|
| 6,446,774 | B2* | 9/2002 | Porter | F16D 48/04 180/197 |
| 6,533,692 | B1* | 3/2003 | Bowen | B60K 6/26 475/5 |
| 7,175,013 | B2* | 2/2007 | Burns et al. | 192/70.12 |
| 7,452,301 | B2* | 11/2008 | Yoshioka | 475/231 |
| 7,549,941 | B2* | 6/2009 | Boddy | B60W 30/02 192/48.4 |
| 7,748,504 | B2* | 7/2010 | Ishii et al. | 188/71.5 |
| 2007/0007059 | A1* | 1/2007 | Nomura | B60K 6/405 180/65.29 |
| 2007/0149338 | A1* | 6/2007 | Ebner et al. | 475/116 |
| 2009/0100965 | A1* | 4/2009 | Sanji | B60K 6/26 74/606 R |
| 2012/0178574 | A1* | 7/2012 | Grochowski et al. | 475/149 |

OTHER PUBLICATIONS

International Search Report mailed Mar. 6, 2012 (PCT/US2011/064830).

* cited by examiner

CONTROLLED GEROTOR ACTUATED PRE-TRANS PARALLEL HYBRID

CROSS-REFERENCE TO RELATED APPLICATIONS

This application claims priority to International Application No. PCT/US2011/064830 filed Dec. 14, 2011 and which claims the benefit of U.S. Provisional Application No. 61/426,816, filed Dec. 23, 2010. The entire disclosure of each of the above applications is incorporated herein by reference.

FIELD

The present disclosure generally relates to a hybrid vehicle drivetrain. More particularly, a pre-transmission unit is positioned downstream from an internal combustion engine and upstream from a power transfer unit. The pre-transmission unit includes an electric motor, a clutch and a fluid pump for controlling the clutch.

BACKGROUND

Vehicle manufacturers have been diligently working to develop alternative powertrain systems in an effort to reduce the level of pollutants exhausted into the air by conventional powertrains equipped with internal combustion engines and also to increase the fuel efficiency thereof. Significant development has been directed to hybrid vehicles. Several different hybrid electric vehicles are configured with an internal combustion and an electric motor that may be operated independently or in combination to drive the vehicle.

In general, there are two types of hybrid vehicles, namely, series hybrid and parallel hybrid. In a series hybrid vehicle, power is delivered to the wheels by the electric motor which draws electrical energy from a battery. The engine is used in a series hybrid vehicle to drive a generator which supplies power directly to the motor or charges the battery when a state of charge falls below a predetermined value. In a parallel hybrid vehicle, the electric motor and the internal combustion engine may be operated independently or in combination with one another.

In one known hybrid vehicle powertrain, the valve train of the internal combustion engine is controlled such that air is not compressed during a compression stroke of the internal combustion engine when power is provided solely from the electric motor. While this configuration may function properly, such an arrangement may be very costly and complex. As such, it may be desirable to provide a simplified hybrid drive system.

SUMMARY

This section provides a general summary of the disclosure, and is not a comprehensive disclosure of its full scope or all of its features.

A pre-transmission unit for a hybrid drive system includes an input shaft adapted to be driven by an internal combustion engine. An electric motor includes a rotor fixed for rotation with an output shaft, and a stator fixed to a housing. A multi-plate clutch is positioned in the housing to drivingly interconnect the input shaft and the rotor. The clutch includes a piston for applying an input force to the clutch plates. A pump is positioned in the housing and includes an input member fixed for rotation with the rotor. The pump provides pressurized fluid to the piston. A valve regulates the fluid pressure applied to the piston and varies the torque transferred by the clutch.

A method of operating a pre-transmission unit in a hybrid drive system of a vehicle includes positioning the pre-transmission unit downstream of an internal combustion engine and upstream from a transmission. The method includes energizing an electric motor of the pre-transmission unit to provide torque to the transmission and drive a pump positioned within the pre-transmission unit. A valve in receipt of pressurized fluid from the pump is controlled to regulate a fluid pressure provided to a clutch that drivingly interconnects the internal combustion engine with the electric motor and the transmission. The valve is opened to cease torque transmission across the clutch to disconnect the internal combustion engine from the electric motor and the transmission.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to a hybrid drive system for a vehicle which functions to provide driving torque to one or more ground-engaging wheels of a vehicle. The hybrid drive system described relates to a parallel hybrid electric vehicle employing an electric motor and an internal combustion engine. The internal combustion engine may be a gasoline engine, a diesel engine, turbine engine, or the like. The electric motor is arranged as a portion of a pre-transmission unit located downstream of the internal combustion engine and upstream of a power transfer unit. The pre-transmission unit also includes an engine disconnect clutch and a pump.

Figure 1:
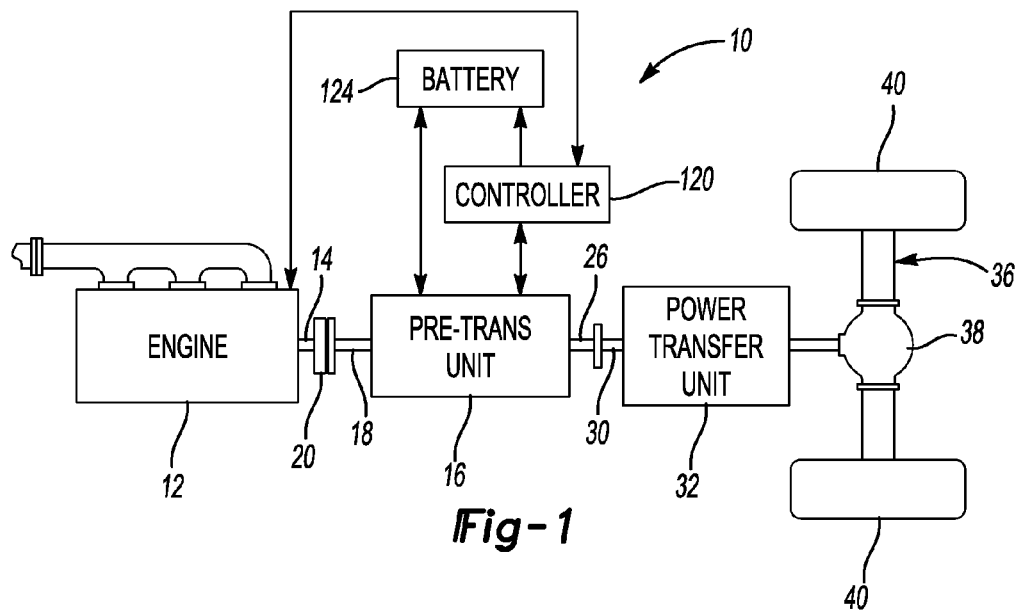
FIG. 1 is a schematic depicting a vehicle equipped with the pre-transmission unit of the present disclosure.

With reference to FIG. 1, a hybrid drive system 10 includes an internal combustion engine 12 providing output torque to a crankshaft 14. A pre-transmission unit 16 includes an input shaft 18 fixed for rotation with crankshaft 14 via a coupling 20. Pre-transmission unit 16 includes an electric motor 22 operable to transmit torque to an output shaft 26 of pre-transmission unit 16. Pre-transmission unit 16 also includes a clutch 28 for drivingly interconnecting crankshaft 14 to pre-transmission unit output shaft 26. An input shaft 30 of a power transfer unit 32 is drivingly coupled to output shaft 26. Power transfer unit 32 may be constructed as a transmission of the manual or automatic type to provide driving torque to an axle assembly 36. Axle assembly 36 may include a differential assembly 38 for distributing torque to wheels 40. It should be appreciated that power transfer unit 32 may also be structured as a transfer case to selectively transfer torque to drive axle 36 alone or also transfer torque to another drive axle not shown in the Figure.

Figure 3:
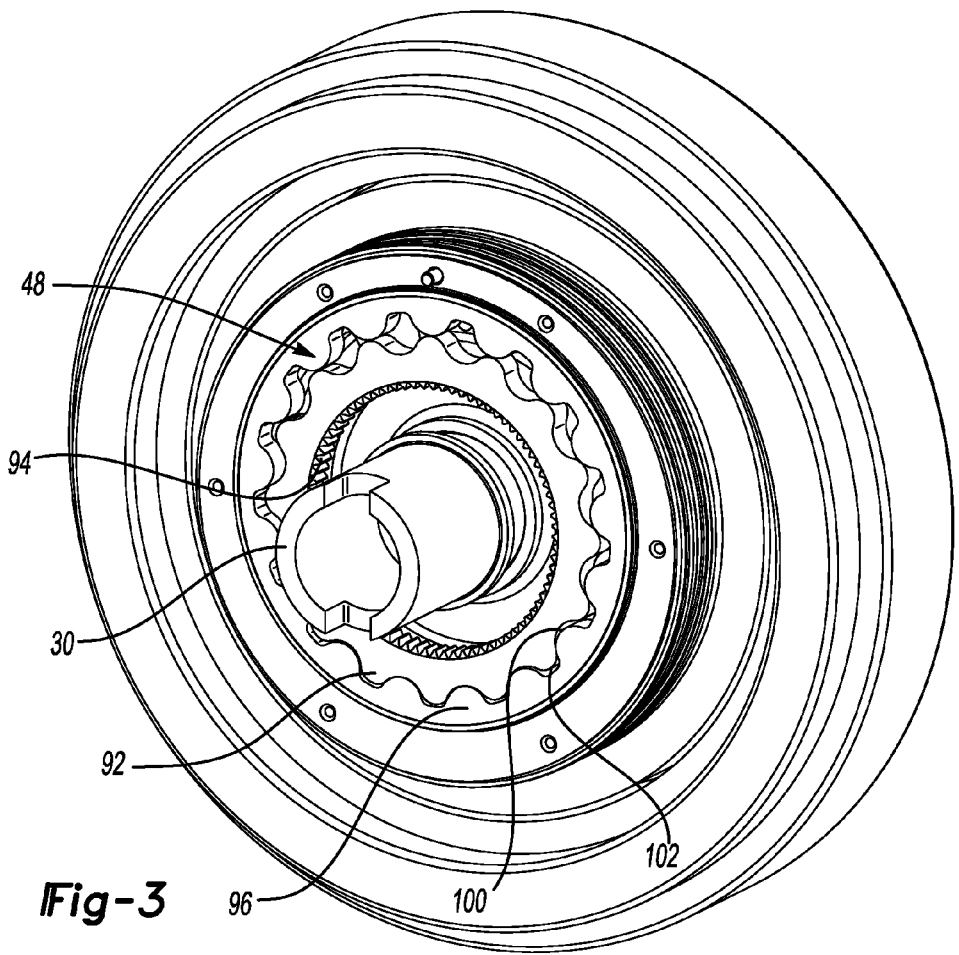
FIG. 3 is a fragmentary perspective view of the pre-transmission unit.
Figure 2:
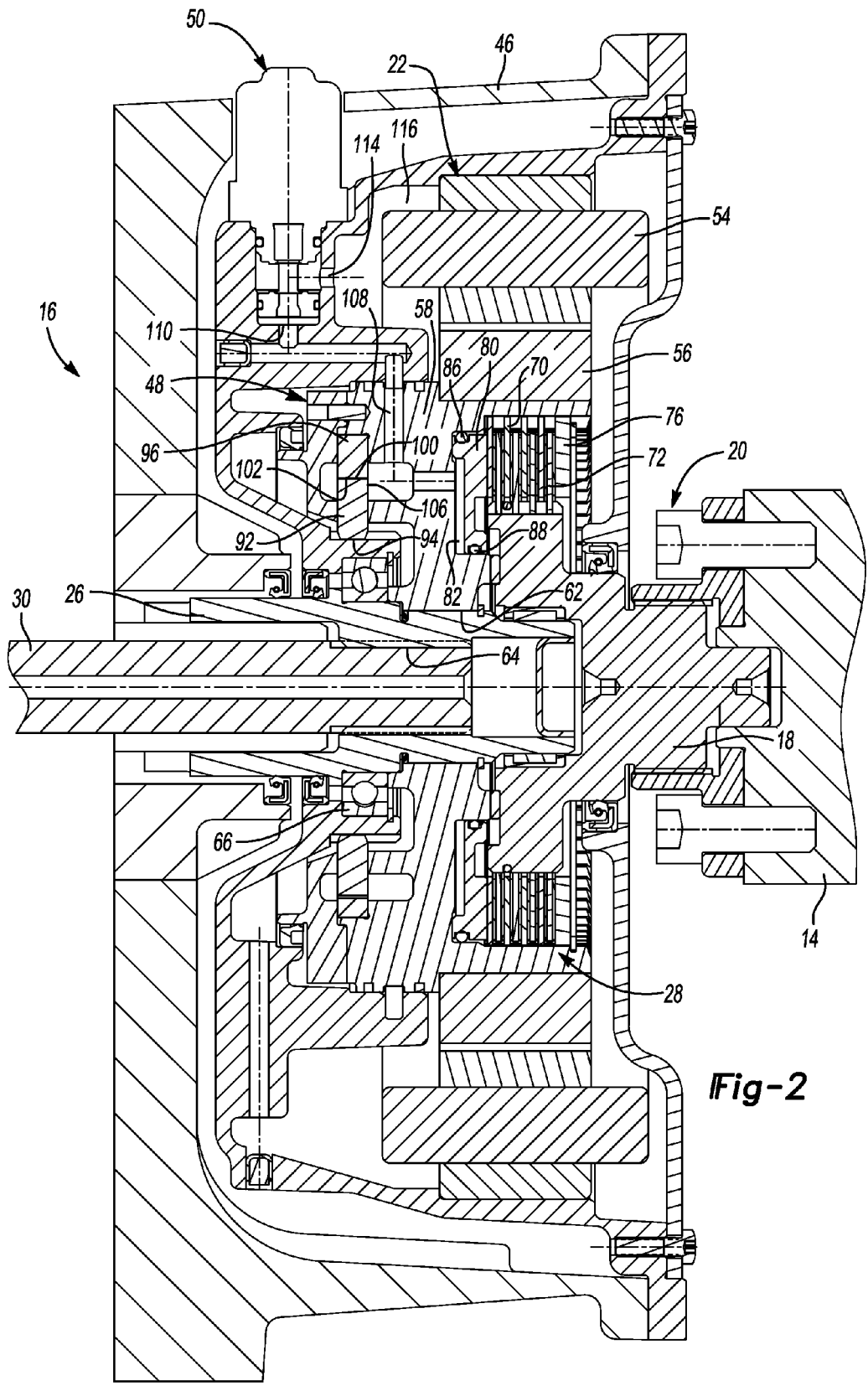
FIG. 2 is a cross-sectional side view of the pre-transmission unit.

With reference to FIGS. 2 and 3, pre-transmission unit 16 includes a housing 46 containing electric motor 22, clutch 28, a gerotor pump 48 and a valve 50. Electric motor 22 includes a stator 54 fixed to housing 46 and a rotor 56. Rotor 56 is fixed for rotation with a hub 58. Hub 58 is rotatable relative to housing 46. Hub 58 is fixed for rotation with output shaft 26 via a spline 62. Output shaft 26 is fixed for rotation with input shaft 30 via a spline 64. A bearing 66 rotatably supports output shaft 26 and hub 58 within housing 46.

Clutch 28 includes a plurality of outer clutch plates 70 interleaved with a plurality of inner clutch plates 72. Outer clutch plates 70 are axially moveable relative to and fixed for rotation with hub 58. A reaction plate 76 is also fixed for rotation with hub 58. Inner clutch plates 72 are axially moveable relative to and fixed for rotation with input shaft 18. An apply plate 80 is positioned within a cavity 82 formed in hub 58. First and second seals 86, 88 are coupled to apply plate 80 allowing the apply plate to function as a piston. As will be described in greater detail hereinafter, pressurized fluid may be selectively provided to cavity 82 to cause apply plate 80 to transfer an input force to the interleaved plates of clutch 28.

Gerotor pump 48 includes an inner pumping member 92 fixed to housing 46 at a splined connection 94 as well as an outer pumping member 96. Outer pumping member 96 includes a plurality of outer lobes 100 cooperating with a plurality of inner lobes 102 formed on inner pumping member 92. Relative rotation between inner pumping member 92 and outer pumping member 96 causes pressurized fluid to exit pump 48 at an outlet port 106. Outlet port 106 is in fluid communication with cavity 82. Outlet port 106 is also in fluid communication with a passageway 108 extending through hub 58 and housing 46 to a valve inlet 110. An outlet 114 of valve 50 is in fluid communication with a sump 116 within housing 46.

Valve 50 is operable to open and close an internal passageway interconnecting inlet 110 and outlet 114. A controller 120 is in communication with engine 12 and pre-transmission unit 16. A battery 124 provides energy to controller 120 and electric motor 22. Controller 120 is configured to provide a pulse width modulation signal to valve 50 to control the pressure provided to cavity 82 acting on apply plate 80. In this manner, the torque transferred by clutch 28 may also be varied. Valve 50 may be operated in a completely open mode as well as a completely closed mode in addition to using pulse width modulation control.

Hybrid drive system 10 is operable in several modes where either electric motor 22, internal combustion engine 12 or the combination of both internal combustion engine 12 and electric motor 22 provide drive torque to power transfer unit 32. Clutch 28 is provided to disconnect crankshaft 14 of internal combustion engine 12 from rotor 56 of electric motor 22. When hybrid drive system 10 operates in a purely electric drive mode, crankshaft 14, and the associated internal components of internal combustion engine 12 are not moved. Pumping losses associated with rotating the internal combustion engine are eliminated.

Clutch 28 may also serve as a launch clutch when it is desired to start the vehicle from a stopped position using either or both internal combustion engine 12 and electric motor 22. Pump 48 provides pressurized fluid to clutch 28 any time relative motion occurs between hub 58 and housing 46. As previously mentioned, transmission input shaft 30 is also fixed for rotation with hub 58. Accordingly, as transmission input shaft 30 or rotor 56 rotates, pump 48 outputs pressurized fluid to cavity 82 engaging apply plate 80 with inner and outer plates 72, 70 of clutch 28. Controller 120 controls valve 50 to regulate the pressure provided to apply plate 80 and vary the torque transferred across clutch 28.

To improve energy efficiency of hybrid drive system 10, internal combustion engine 12 may be frequently stopped and started. Electric motor 22 and clutch 28 may be used as a starter motor to rotate crankshaft 14 and start internal combustion engine 12. Alternatively, if the vehicle equipped with hybrid drive system 10 is moving, clutch 28 may be used to transfer driveline torque from the vehicle wheels through power transfer unit 32 and clutch 28 to crankshaft 14. Controller 120 and valve 50 function to smoothly transfer energy to crankshaft 14 to allow an internal combustion engine starting procedure with minimal noise, vibration or harshness transferred to the vehicle occupants.

Other modes of operating hybrid drive system 10 include operating electric motor 22 as a generator in a regenerative braking mode of operation or simply a battery charging mode of operation where internal combustion engine 12 drives not only wheels 40 but also rotor 56 to charge battery 124.

By configuring pre-transmission unit 16 in the manner described, the total number of components used to provide the various functions is reduced when compared to the prior art. The overall package size required is also minimized. The compact packaging is at least partially accomplished by sizing rotor 56 to encompass clutch 28 and positioning gerotor pump 48 immediately adjacent electric motor 22 and clutch 28. To further condense the size of pre-transmission unit 16, each of the rotating components of electric motor 22, clutch 28 and pump 48 rotate about a common axis of rotation as crankshaft 14 and transmission input shaft 30.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pre-transmission unit for a hybrid drive system, comprising:
   a housing;
   a pre-transmission input shaft adapted to be driven by an internal combustion engine;
   an output shaft;
   an electric motor including a rotor fixed for rotation with a hub, the hub being fixed for rotation with the output shaft and including a cavity, and the electric motor further including a stator fixed to the housing;
   a multi-plate clutch positioned in the housing and drivingly interconnecting the pre-transmission input shaft and the rotor, the clutch including a piston disposed in the cavity of the hub for applying an input force to the clutch plates;
   a pump positioned in the housing and including a first pump member fixed to the housing and a second pump member rotatably driven by the hub, the pump providing pressurized fluid through an outlet port in fluid communication with the cavity and to the piston in response to rotation of the second pump member relative to the first pump member, the outlet port being in fluid communication with a passageway extending through the hub and the housing to a valve inlet; and a valve including an internal passageway interconnecting the valve inlet and a valve outlet, the valve outlet being in fluid communication with a sump in the housing, and wherein a battery provides energy to the electric motor and a controller, and the controller provides a signal to the valve causing the valve to open or close the internal passageway interconnecting the valve inlet and the valve outlet for regulating the fluid pressure applied to the cavity containing the piston and varying the torque transferred by the clutch.

2. The pre-transmission unit of claim 1, wherein the second pump member includes a multi-lobed gerotor rotor and the first pump member is a multi-lobed gerotor stator fixed to the housing.

3. The pre-transmission unit of claim 2, wherein the hub is fixed to the gerotor rotor, the electric motor rotor and the output shaft.

4. The pre-transmission unit of claim 3, wherein the hub includes a fluid passageway interconnecting the cavity containing the piston and the outlet port of the pump.

5. The pre-transmission unit of claim 4, wherein the valve is positioned within the housing in fluid communication with the passageway extending through the housing and the fluid passageway through the hub to interconnect the piston and the outlet port of the pump.

6. The pre-transmission unit of claim 1, wherein the electric motor rotor circumscribes the clutch.

7. The pre-transmission unit of claim 1, wherein the clutch plates, the second pump member, the electric motor rotor, the pre-transmission input shaft, and the output shaft rotate about a common axis.

8. The pre-transmission unit of claim 1, wherein the signal provided by the controller is a pulse width modulation signal, and the valve is operable to open and close in response to the pulse width modulation signal and regulate the pressure of the fluid acting on the piston.

9. The pre-transmission unit of claim 8, wherein the valve allows pressurized fluid from the pump to enter the sump when open.

10. The pre-transmission unit of claim 1, wherein the electric motor provides torque to the output shaft, the output shaft is fixed for rotation with a transmission input shaft of a power transfer unit, and the power transfer unit provides driving torque to an axle assembly to launch a vehicle from a standstill.

11. The pre-transmission unit of claim 1, wherein the electric motor is operable as a generator.

12. The pre-transmission unit of claim 1 wherein the hub is rotatable relative to the housing, and wherein a crankshaft of the internal combustion engine is fixed for rotation with the pre-transmission input shaft, wherein the multi-plate clutch includes a plurality of outer clutch plates interleaved with a plurality of inner clutch plates, the outer clutch plates being axially movable relative to and fixed for rotation with the hub, and the inner clutch plates being axially movable and fixed for rotation with the pre-transmission input shaft.

13. A pre-transmission unit for a hybrid vehicle having an internal combustion engine and a power transfer unit drivingly connected to an axle assembly, the pre-transmission unit comprising:

a housing;

a pre-transmission input shaft extending into the housing and being fixed for rotation with a crankshaft of the internal combustion engine;

an output shaft fixed for rotation with a rotary input component of the power transfer unit;

a hub fixed for rotation with the output shaft and defining a pressure cavity;

a clutch assembly including a multi-plate clutch pack operably disposed between the hub and the pre-transmission input shaft, and a piston disposed within the pressure cavity for applying a clutch engagement force on the clutch pack in response to a fluid pressure applied to the piston within the pressure cavity;

an electric motor surrounding the hub and including a non-rotary stator and a rotor fixed for rotation with the hub;

a gerotor pump having a non-rotary first pump member and a rotary second pump member, the second pump member being rotatably driven by the hub such that relative rotation between the first and second pump members causes pressurized fluid to be supplied through an outlet port and to the pressure cavity, the outlet port being in fluid communication with a passageway extending through the hub and the housing to a valve inlet; and an electrically-controlled valve including an internal passageway interconnecting a valve outlet and the valve inlet, the valve inlet being in fluid communication with the pressure cavity, wherein a battery provides energy to the electric motor and a controller, and the controller provides a signal to the valve for regulating the fluid pressure applied to the piston and varying the torque transferred by the clutch assembly.

14. The pre-transmission unit of claim 13 further including a sump of fluid retained within the housing, wherein the stator of the electric motor is fixed to the housing, wherein the non-rotary first pump member is a multi-lobed gerotor stator fixed to the housing and the rotary second pump member is a multi-lobed gerotor rotor rotatably driven by the hub, wherein the hub defines the passageway fluidically interconnecting the pressure cavity to the outlet port of the gerotor pump, and wherein the valve is operable to regulate the fluid pressure by controlling fluid flow from the passageway to the sump.

15. The pre-transmission unit of claim 14 wherein the output shaft surrounds a portion of the rotary input component of the power transfer unit and is drivingly interconnected thereto by a first splined connection, wherein the hub surrounds a portion of the output shaft and is drivingly interconnected thereto via a second splined connection, and wherein the hub defines a drum portion having an outer portion to which the rotor of the electric motor is fixed and an inner portion to which a set of outer clutch plates of the multi-plate clutch pack are coupled for rotation.

16. The pre-transmission unit of claim 13, wherein the hub is rotatable relative to the housing, and wherein the multi-plate clutch pack includes a plurality of outer clutch plates interleaved with a plurality of inner clutch plates, the outer clutch plates being axially movable relative to and fixed for rotation with the hub, and the inner clutch plates being axially movable and fixed for rotation with the pre-transmission input shaft.

17. A pre-transmission unit for a hybrid drive system installed in a motor vehicle between an internal combustion engine and a transmission, the pre-transmission unit comprising:

a housing defining an internal chamber having a sump of fluid;

an input shaft having a first end extending into the internal chamber of the housing and a second end adapted to be fixed for rotation with a rotary output of the internal combustion engine;

an output shaft having a first end extending into the internal chamber of the housing and a second end adapted to be fixed for rotation with a rotary input of the transmission;

a hub fixed for rotation with the first end of the output shaft, the hub being configured to define a pressure cavity, a pump outlet port, and a flow passageway providing fluid communication between the pump outlet port and the pressure cavity;

a clutch assembly including a multi-plate clutch pack and a piston, the multi-plate clutch pack being operably disposed between the first end of the input shaft and the hub, the piston being disposed in the pressure cavity and operable for applying a compressive clutch engagement force on the clutch pack in response to a fluid pressure applied to the piston within the pressure cavity;

an electric motor surrounding the hub and configured to include a non-rotary stator that is grounded to the housing and a rotor fixed for rotation with the hub;

a fluid pump operably disposed between the housing and the hub and including a first pump member fixed to the housing and a second pump member rotatably driven by the hub, the fluid pump configured to draw fluid from the sump and deliver pressurized fluid to the pump outlet port for delivery to the pressure cavity through the flow passageway in response to rotation of the second pump member relative to the the first pump member;

an electrically-controlled valve mounted in the housing and including an internal passageway interconnecting a valve inlet and a valve outlet, the valve inlet being in fluid communication with the flow passageway, and the valve outlet being in fluid communication with the sump; and a controller providing a control signal to the valve causing the valve to open or close the internal passageway for regulating flow of the fluid between the valve inlet and the valve outlet and varying the fluid pressure applied to the piston within the pressure cavity.

18. The pre-transmission unit of claim 17, wherein a battery provides electrical energy to the electric motor and the controller.

19. The pre-transmission unit of claim 17, wherein the input shaft, the output shaft, the hub and the rotor of the electric motor are aligned for rotation about a common rotary axis.

20. The pre-transmission unit of claim 17, wherein the clutch pack is disposed between a clutch hub driven by the first end of the input shaft and a clutch drum formed by the hub, and wherein the rotor of the electric motor is fixed to the clutch drum on the hub.

21. The pre-transmission unit of claim 17, wherein the electric motor drives the hub to provide torque to the output shaft for driving the transmission.

* * * * *